US011396116B2

(12) United States Patent
Iida

(10) Patent No.: US 11,396,116 B2
(45) Date of Patent: Jul. 26, 2022

(54) POWDER SLUSH MOLDING SYSTEM

(71) Applicant: TOYOTA JIDOSHA KABUSHIKI KAISHA, Toyota (JP)

(72) Inventor: Tomoya Iida, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 617 days.

(21) Appl. No.: 16/284,236

(22) Filed: Feb. 25, 2019

(65) Prior Publication Data

US 2019/0263029 A1 Aug. 29, 2019

(30) Foreign Application Priority Data

Feb. 27, 2018 (JP) .............................. JP2018-033630

(51) Int. Cl.
| | | |
|---|---|---|
| *B29C 41/18* | (2006.01) | |
| *B29C 41/04* | (2006.01) | |
| *B29C 41/46* | (2006.01) | |
| *B29C 41/00* | (2006.01) | |
| *B29C 41/42* | (2006.01) | |
| B29L 31/30 | (2006.01) | |
| B29K 27/06 | (2006.01) | |
| B29K 105/00 | (2006.01) | |

(52) U.S. Cl.
CPC ............ *B29C 41/18* (2013.01); *B29C 41/003* (2013.01); *B29C 41/04* (2013.01); *B29C 41/42* (2013.01); *B29C 41/46* (2013.01); *B29K 2027/06* (2013.01); *B29K 2105/251* (2013.01); *B29L 2031/3041* (2013.01)

(58) Field of Classification Search
None
See application file for complete search history.

(56) References Cited

U.S. PATENT DOCUMENTS

| 5,814,261 A * | 9/1998 | Steckling .............. B29C 31/006 |
| | | 264/297.6 |
| 2005/0053690 A1* | 3/2005 | Bond ...................... B29C 41/52 |
| | | 425/435 |

FOREIGN PATENT DOCUMENTS

| DE | 10 2005 014 942 A1 | 10/2006 |
| EP | 3 284 569 A1 | 2/2018 |
| JP | 1-297224 A | 11/1989 |
| JP | 02-041216 A | 2/1990 |
| JP | 2-220819 A | 9/1990 |
| JP | 2008-137272 A | 6/2008 |

* cited by examiner

*Primary Examiner* — Francisco W Tschen
*Assistant Examiner* — Adrianna N Konves
(74) *Attorney, Agent, or Firm* — Sughrue Mion, PLLC

(57) ABSTRACT

Disclosed is a powder slush molding system that molds a slush skin by melting and adhering a powder resin material to an inner surface of a mold that is heated. The powder slush molding system includes a heating device, a rocking device, a cooling device, a demolding device, and a transfer device configured to transfer the mold between these devices. The cooling device includes a cooling bath and a table configured to turn upside down vertically above the cooling bath. The mold fixedly placed on an upper surface of the table faces the cooling bath side when the table is turned upside down. The table is configured to allow the mold to be placed also on a back surface of the table. The back surface faces upward when the table is turned upside down.

3 Claims, 15 Drawing Sheets

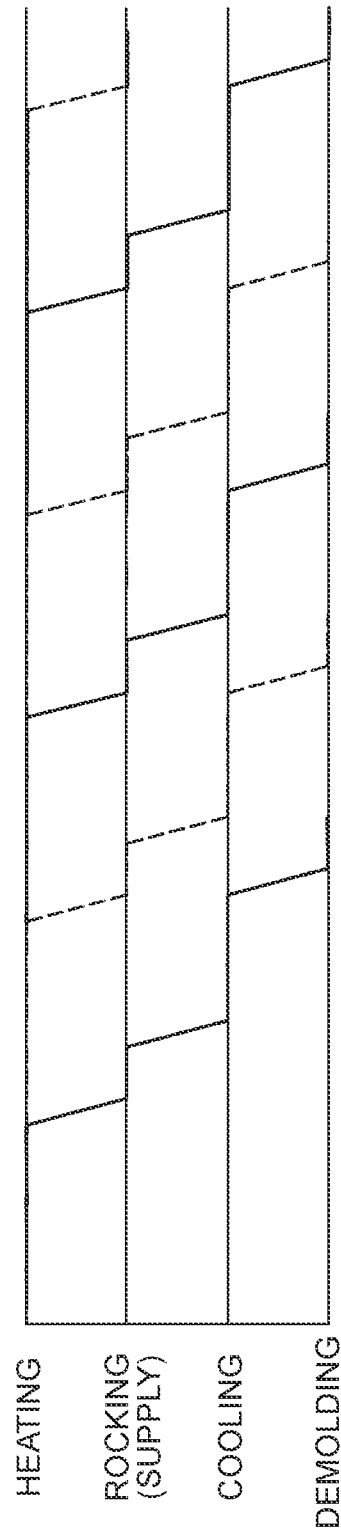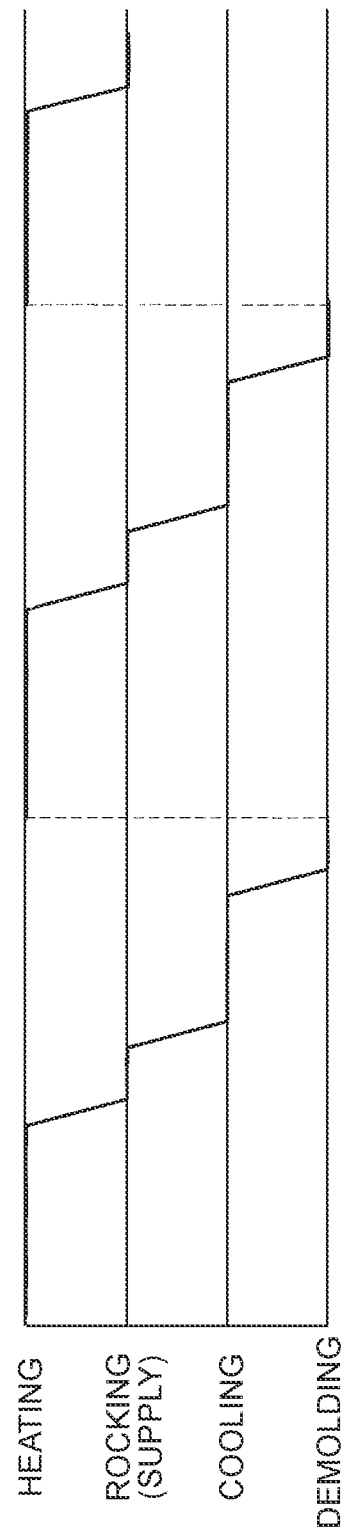

POWDER SLUSH MOLDING SYSTEM

INCORPORATION BY REFERENCE

The disclosure of Japanese Patent Application No. 2018-033630 filed on Feb. 27, 2018 including the specification, drawings and abstract is incorporated herein by reference in its entirety.

BACKGROUND

1. Technical Field

The disclosure relates to a powder slush molding system.

2. Description of Related Art

An interior panel of a vehicle, such as an instrument panel, is usually formed of a resin member having a multilayer structure. For example, there is conventionally known an interior panel having a lowermost layer formed of a hard core member manufactured by injection molding and an uppermost layer (surface layer) formed of a skin member (so-called slush skin) with good touch feeling.

In general, the slush skin is molded by a powder slush molding method that forms a resin layer by melting and adhering a powder resin material to an inner surface of a heated mold and then removes the resin layer, which has been cured by cooling with the mold, from the mold.

For example, Japanese Unexamined Patent Application Publication No. 2-41216 (JP 2-41216 A) discloses a powder slush molding machine including an endless chain conveyor for passing a slush mold through the inside of a hot air furnace (heating furnace) and a robot that receives the slush mold from a mold carrying arm attached to the endless chain conveyor, transfers the slush mold to a powdering device, a reheating device, a cooling device, and a demolding device in order, and transfers the slush mold, from which a molded article has been removed, again to the mold carrying arm.

SUMMARY

In the meantime, JP 2-41216 A describes that the number of molds may be selected as appropriate. In this regard, in the case of a system (molding machine) including five working devices (heating furnace, powdering device, reheating device, cooling device, and demolding device) like the one disclosed in JP 2-41216 A, it is preferable in terms of productivity to perform simultaneous production using five molds (e.g. molds A, B, C, D, and E) as many as the number of the working devices.

When performing the simultaneous production using the five working devices and the five molds, it is necessary, in order to transfer the mold A from the demolding device to the heating furnace, to transfer the mold E from the heating furnace to the powdering device. Likewise, in order to transfer the mold E from the heating furnace to the powdering device, it is necessary to transfer the mold D from the powdering device to the reheating device. Therefore, when performing the simultaneous production using the molds as many as the number of the working devices, one or more excess facilities are required.

For example, in the powder slush molding machine of JP 2-41216 A, assuming that a transfer device or a temporary-placement stage is added as an excess facility and that while the mold A having been subjected to demolding is held suspended by the transfer device or is placed on the temporary-placement stage, the mold B is transferred from the cooling device to the demolding device, the mold C is transferred from the reheating device to the cooling device, the mold D is transferred from the powdering device to the reheating device, and the mold E is transferred from the heating furnace to the powdering device in this order by the robot, it is possible to circulate the molds as many as the number of the working devices in the powder slush molding machine.

However, with the configuration in which the transfer device or the temporary-placement stage is added as described above, there arises a problem that the installation space increases or a problem that the equipment investment becomes large depending on the scale of the transfer device or the temporary-placement stage.

The disclosure provides a technique that smoothly performs simultaneous production using molds as many as the number of working devices, while suppressing an increase in installation space and equipment investment, in a powder slush molding system.

In a powder slush molding system according to a first aspect of the disclosure, a temporary-placement (standby) space for a mold having been subjected to demolding is secured using an existing working device.

The first aspect of the disclosure is directed to a powder slush molding system that molds a slush skin by melting and adhering a powder resin material to an inner surface of a mold that is heated.

The powder slush molding system includes: a heating device configured to heat the mold using a heating furnace; a rocking device configured to rock the mold, the rocking device configured to rock the mold in a state where the powder resin material is supplied to the mold that is heated; a cooling device configured to cool the mold to which the powder resin material is melted and adhered; a demolding device configured to remove the slush skin from the mold that is cooled; and a transfer device configured to transfer the mold between the heating device, the rocking device, the cooling device, and the demolding device, wherein: the cooling device includes a cooling bath and a table configured to turn upside down vertically above the cooling bath; the mold fixedly placed on an upper surface of the table faces the cooling bath side when the table is turned upside down; and the table is configured to allow the mold to be placed on a back surface of the table. The back surface faces upward when the table is turned upside down.

With this configuration, a temporary-placement space for a mold having been subjected to demolding is secured using a table of a cooling device that is usually provided in a powder slush molding system, and therefore, it is possible to smoothly transfer the mold to a most time-consuming heating device while suppressing an increase in installation space.

Herein, in a cooling device, it is typical to perform cooling by immersing an outer surface, to which a powder resin material is not melted and adhered, of a mold in water, sand, or the like in a cooling bath, and further, it is physically difficult to hold water, sand, or the like in the air, and therefore, it is usual to employ a mechanism that turns a placed mold upside down above the cooling bath to cause the mold to face the cooling bath side. In the first aspect of the disclosure, since the mold can be placed on the back surface of the table that is turned upside down above the cooling bath, the existing facility can be used so that it is possible to suppress equipment investment.

In this way, it is possible to smoothly perform simultaneous production using molds as many as the number of working devices, while suppressing an increase in installation space and equipment investment.

As one aspect of the table having the function described above, in the powder slush molding system, the table may have a shape of a rectangular parallelepiped (which may, of course, be a strict rectangular parallelepiped or may be an approximate rectangular parallelepiped in consideration of the technical common knowledge) and may be configured to be rotatable about the axis passing through the centers of a pair of side surfaces, facing each other, of the rectangular parallelepiped, a first guide for positioning the mold may be provided on the upper surface side of the table, and a second guide for positioning the mold may be provided also on the back surface side of the table at a position that is the same as a positioning position of the mold on the upper surface of the table.

With this configuration, since the rectangular parallelepiped table is configured to be rotatable about the axis passing through the centers of the pair of side surfaces facing each other, the plane position and height of the upper surface and the plane position and height of the back surface when turned upside down can be made the same. Further, since the second guide for positioning the mold is provided on the back surface side at the same position as the positioning position of the mold on the upper surface, the plane position and height of the mold before and after cooling fixedly placed on the upper surface and the plane position and height of the mold after demolding temporarily placed on the back surface turned upside down can be made the same. Therefore, even when, for example, transfer of the mold is repeated by the automated transfer device, the mold can be reliably transferred between the devices, for example, without failing to pick up the mold by the transfer device.

Further, in the powder slush molding system, the cooling device may be coupled to the demolding device, the demolding device may include a frame having an upper surface that is flush with the upper surface of the table and with the back surface of the table turned upside down, the frame configured to allow the mold to be placed on the upper surface of the frame, and a transport device configured to move the mold between the table and the frame may be further provided. The cooling device may be located between the transfer device and the demolding device.

With this configuration, the cooling device and the demolding device are coupled together, and the upper surface (and the back surface when turned upside down) of the table of the cooling device and the upper surface of the frame of the demolding device are flush with each other, and therefore, the mold can be freely transported between the cooling device and the demolding device using a simple transport device, for example, assembled by a rail and a motor, i.e. without using the transfer device and while suppressing equipment investment.

For example, in the case where the sequence is configured such that the operations end in order of demolding, cooling, rocking, and heating, when demolding has ended in the state where a mold D is present in the heating device, a mold C is present in the rocking device, a mold B is present in the cooling device, and a mold A is present in the demolding device, even when the transfer device is performing another operation, the mold A can be transported from the frame of the demolding device to the table of the cooling device by the transport device. Consequently, the mold A can be temporarily placed on the back surface of the table above the mold B being cooled in the cooling bath.

Then, the mold A is transferred from the cooling device to the heating device (e.g. in front of the heating furnace) by the transfer device. Since the cooling device is located between the transfer device and the demolding device, compared to the case where the mold A is transferred directly from the demolding device, it is possible to downscale the transfer device, i.e. suppress an increase in installation space and equipment investment.

When cooling of the mold B has ended while transferring the mold A to the heating device by the transfer device, the table is turned upside down and then the mold B can be transported to the frame of the demolding device by the transport device without waiting for the end of the transfer of the mold A. Consequently, the vacant state of the cooling device is created.

Then, when the forming operation of the mold C has ended, the mold C can be transferred to the vacant cooling device by the transfer device that has finished the transfer of the mold A to the heating device. Consequently, the vacant state of the rocking device is created. Then, when heating of the mold D has ended so that the mold D is unloaded from the heating furnace, the mold A is loaded into the heating furnace in turn and the mold D can be immediately transferred to the vacant rocking device by the transfer device. Consequently, it is possible to suppress the influence on the quality due to temperature drop of the heated mold D.

As a result, the state is achieved in which the mold A is present in the heating device, the mold D is present in the rocking device, the mold C is present in the cooling device, and the mold B is present in the demolding device. Therefore, by repeating the same sequence, it is possible to perform simultaneous production of slush skins efficiently and with high quality by smoothly circulating the four molds A, B, C, and D as many as the number of the working devices, i.e. the heating device, the rocking device, the cooling device, and the demolding device, in the powder slush molding system.

As described above, with a powder slush molding system according to the disclosure, it is possible to smoothly perform simultaneous production using molds as many as the number of working devices while suppressing an increase in installation space and equipment investment.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 14A is a typical time chart in powder slush molding;

FIG. 14B is a typical time chart in powder slush molding;

DETAILED DESCRIPTION OF EMBODIMENTS

An embodiment of the disclosure will be described below with reference to the drawings.

Overall Configuration

Figure 1:
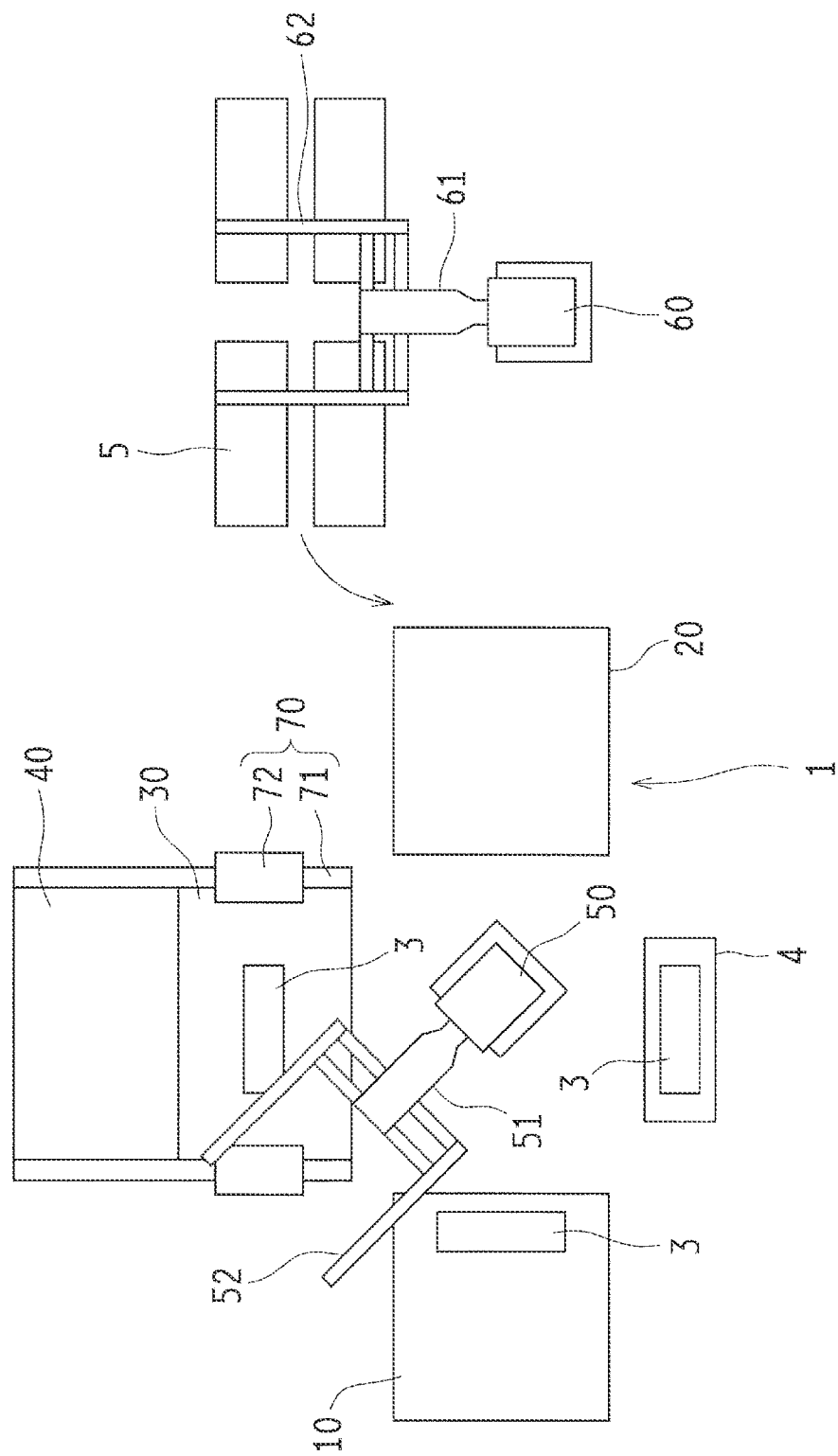
FIG. 1 is a plan view schematically showing a powder slush molding system according to an embodiment of the disclosure.

FIG. 1 is a plan view schematically showing a powder slush molding system 1 according to this embodiment. The powder slush molding system 1 is configured to mold a slush skin 8 (see FIGS. 5A and 5B) by melting and adhering a powder resin material 6 such as polyvinyl chloride resin to an inner surface 3a of a heated slush mold 3 to form a resin layer 7 (see FIGS. 3A to 3C) and then removing the resin layer 7, which has been cured by cooling with the slush mold 3, from the slush mold 3. As shown in FIG. 1, the powder slush molding system 1 includes a heating device 10, a rocking device 20, a cooling device 30, a demolding device 40, a mold placement stage 4, a first robot 50, and a second robot 60. The heating device 10, the cooling device 30 and the demolding device 40, the rocking device 20, and the mold placement stage 4 are disposed annularly around the first robot 50.

The first robot 50 and the second robot 60 are each a so-called articulated robot and are each configured to be rotatable by 360 degrees about the vertical direction. The first robot 50 and the second robot 60 are configured to respectively pick up and transfer a slush mold 3 and a resin box 5 using jigs 52, 62 attached to articulated arms 51, 61. According to predetermined operation programs and input commands, the first robot 50 and the second robot 60 are configured to respectively repeat operations of transferring a slush mold 3 and a resin box 5 from predetermined positions to predetermined positions.

Specifically, the first robot 50 is mainly configured to transfer a slush mold 3, having been subjected to demolding, from the cooling device 30 to the heating device 10, transfer a slush mold 3, having been subjected to heating, from the heating device 10 to the rocking device 20, and transfer a slush mold 3, having been subjected to formation of a resin layer 7, from the rocking device 20 to the cooling device 30. When molding a slush skin 8 having a different shape during the molding operation, the first robot 50 is configured to select an appropriate slush mold 3, according to an input command, from the mold placement stage 4 on which a plurality of slush molds 3 having different shapes is placed, and transfer the selected slush mold 3 to the heating device 10 while replacing a slush mold 3 having been subjected to demolding.

On the other hand, the second robot 60 is configured to select, from resin box groups containing powder resin materials 6 of different colors according to car models, a resin box 5 containing the powder resin material 6 of the appropriate color according to an input command, transfer the selected resin box 5 to the rocking device 20, and transfer a resin box 5 after formation of a resin layer 7 from the rocking device 20 to a material supply area (not shown).

Figure 2A:
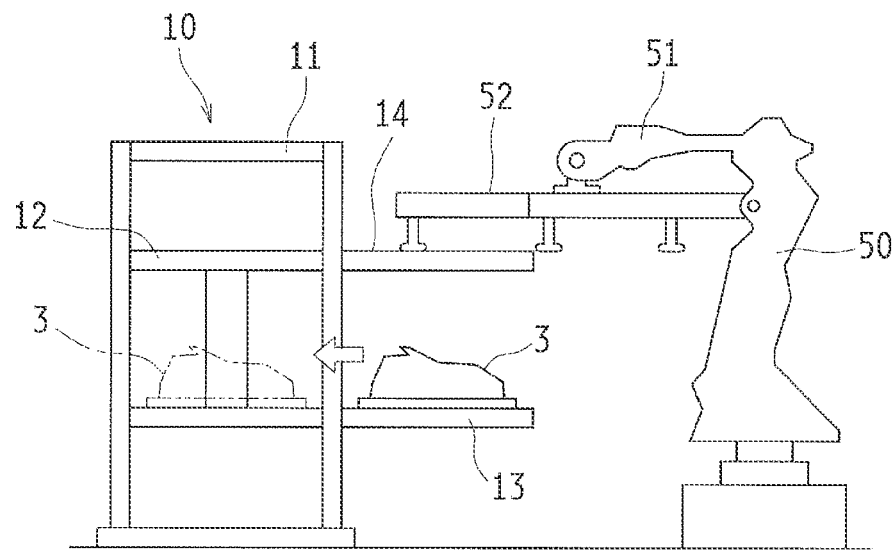
FIG. 2A is a diagram for schematically explaining a heating device.
Figure 2B:
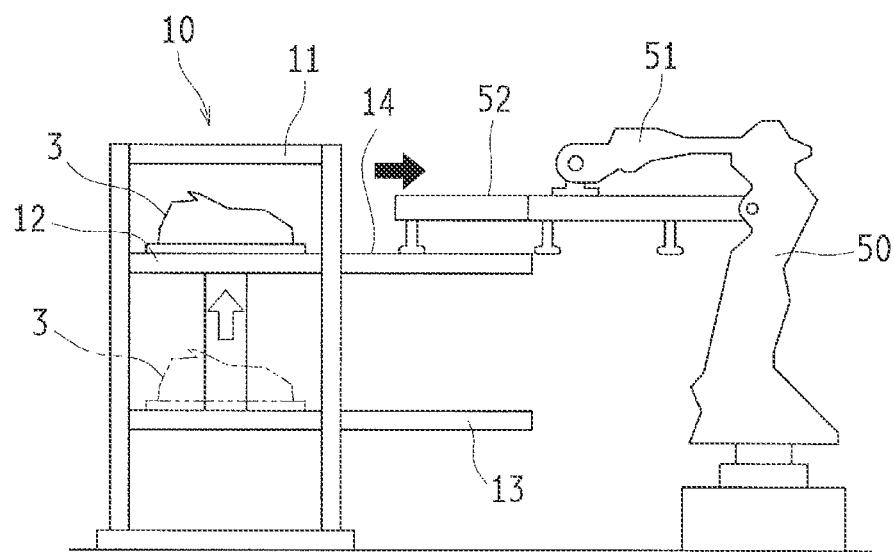
FIG. 2B is a diagram for schematically explaining the heating device.

FIGS. 2A and 2B are diagrams for schematically explaining the heating device 10. As shown in FIGS. 2A and 2B, the heating device 10 includes a hermetic-type heating furnace 11, an elevator 12, a lower placement stage 13, and an upper placement stage 14 and is configured to heat a slush mold 3 using the heating furnace 11.

More specifically, in the heating device 10, as shown in FIG. 2A, a slush mold 3 is placed on the lower placement stage 13 by the first robot 50, and when a sensor (not shown) has detected the slush mold 3, the hermetic-type heating furnace 11 opens provided that the heating furnace 11 is vacant, and the slush mold 3 is loaded into the heating furnace 11 by drive rollers (not shown). As indicated by a white arrow in FIG. 2B, the slush mold 3 loaded into the heating furnace 11 is lifted by the elevator 12 and heated in the sealed heating furnace 11 at about 500° C. for a predetermined time. When the heating has ended, the heating furnace 11 opens, and as indicated by a black arrow in FIG. 2B, the slush mold 3 is unloaded onto the upper placement stage 14 by the drive rollers. These operations in the heating device 10 are automatically performed according to a predetermined operation program and input command. In order to minimize the influence on the quality due to temperature drop, the slush mold 3 unloaded onto the upper placement stage 14 is immediately transferred to the rocking device 20 by the first robot 50.

Figure 3A:
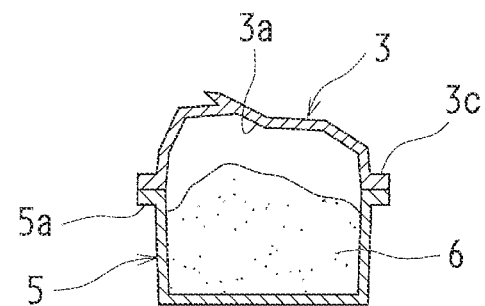
FIG. 3A is a diagram for schematically explaining the operation in a rocking device.
Figure 3B:
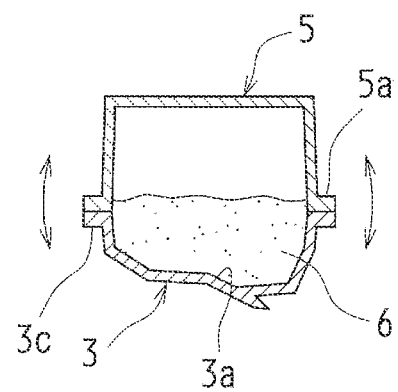
FIG. 3B is a diagram for schematically explaining the operation in the rocking device.
Figure 3C:
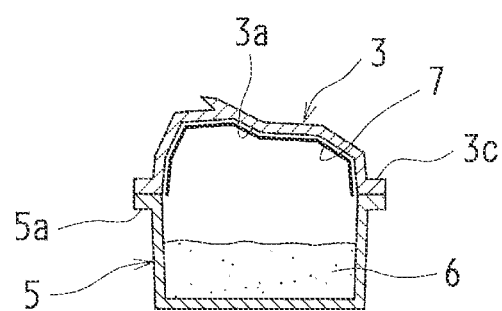
FIG. 3C is a diagram for schematically explaining the operation in the rocking device.

FIGS. 3A to 3C are diagrams for schematically explaining the operations in the rocking device 20. The rocking device 20 is configured to form a resin layer 7 by supplying a powder resin material 6 to a heated slush mold 3 and rocking the slush mold 3 with the supplied powder resin material 6. More specifically, in the rocking device 20, as shown in FIG. 3A, a flange portion 3c of a slush mold 3 transferred by the first robot 50 and a flange portion 5a of a resin box 5 transferred by the second robot 60 are joined together, and then, as shown in FIG. 3B, the slush mold 3 and the resin box 5 are turned upside down to rock, thereby melting and adhering a powder resin material 6 to an inner surface 3a of the heated slush mold 3. When the rocking for a predetermined time has ended, the slush mold 3 and the resin box 5 are turned upside down again. Then, as shown in FIG. 3C, a resin layer 7 is formed on the inner surface 3a of the slush mold 3, and the remaining powder resin material 6 is received in the resin box 5.

These operations in the rocking device 20 are automatically performed according to a predetermined operation program and input command. The rocking time and so on are set per shape of slush mold 3 and per kind of powder resin material 6 so that even when the slush mold 3 is changed or the color (property) of the powder resin material 6 is changed, a slush skin 8 with optimal thickness can always be molded. The slush mold 3 formed with the resin layer 7 is transferred from the rocking device 20 to the cooling device 30 by the first robot 50, while the resin box 5 is transferred from the rocking device 20 to the material supply area by the second robot 60.

Figure 4A:
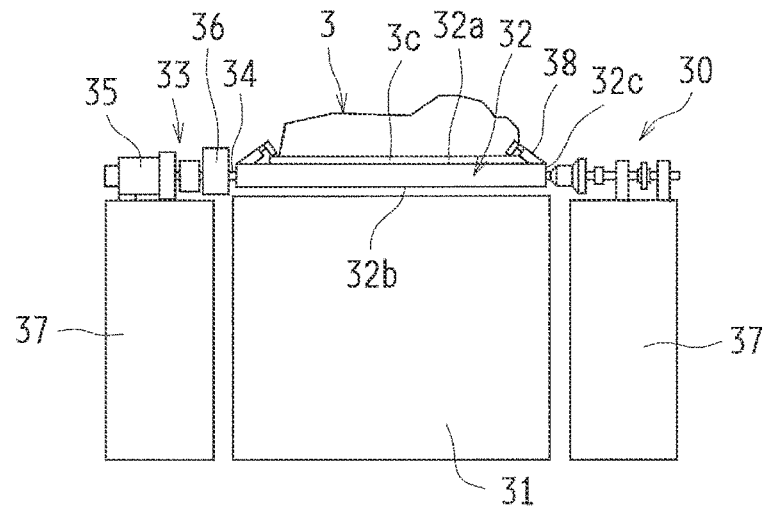
FIG. 4A is a diagram for schematically explaining a cooling device.
Figure 4B:
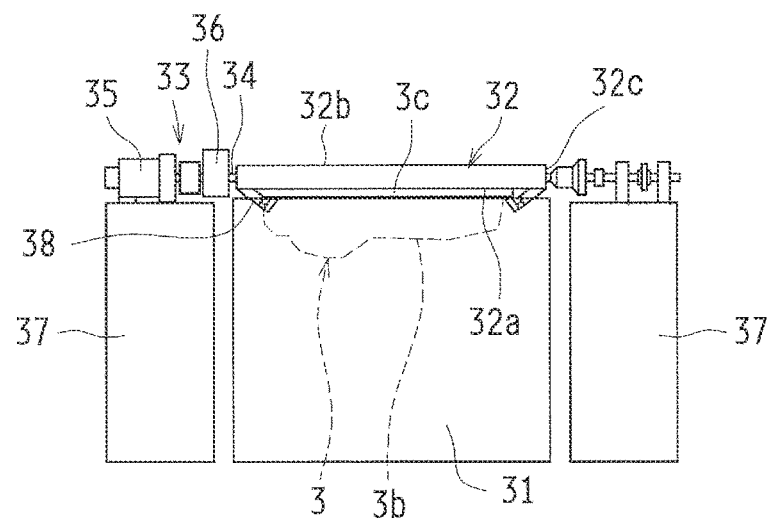
FIG. 4B is a diagram for schematically explaining the cooling device.
Figure 4C:
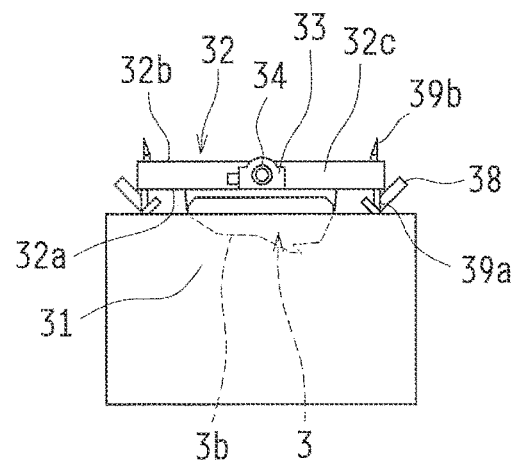
FIG. 4C is a diagram for schematically explaining the cooling device.

FIGS. 4A to 4C are diagrams for schematically explaining the cooling device 30. As shown in FIGS. 4A to 4C, the cooling device 30 includes a cooling bath 31 storing water, a table 32, a rotation mechanism 33 that turns the table 32 upside down, and a pair of support stands 37 supporting the rotation mechanism 33, and is configured to cool a slush mold 3 to which a powder resin material 6 is melted and adhered (formed with a resin layer 7).

Specifically, the table 32 has a generally rectangular parallelepiped shape, and a rotary shaft 34 is attached to the table 32 to pass through the centers of a pair of side surfaces 32c facing each other in a longitudinal direction of the table 32 (right-left direction in FIG. 4A) (see FIG. 4C). The rotation mechanism 33 includes a motor 35, a speed reducer 36, and so on and is configured to rotate the rotary shaft 34 at an appropriate speed. The rotation mechanism 33 is fixed to upper end portions of the pair of support stands 37 provided on both sides of the cooling bath 31 in a longitudinal direction of the cooling bath 31. That is, the table 32 is supported above the cooling bath 31 by the pair of support stands 37 provided on both sides of the cooling bath 31 in the longitudinal direction of the cooling bath 31 so as to be rotatable about the rotary shaft 34 via the rotation mechanism 33.

Guides 39a (first guides) for positioning a slush mold 3 are provided on the upper surface 32a side of the table 32. As shown in FIG. 4C, the guides 39a are provided at both end portions of the upper surface 32a in a direction perpendicular to the longitudinal direction so as to face each other, and facing surfaces of the guides 39a form tapered surfaces that extend away from each other as going upward. With this configuration, when placing a slush mold 3 on the upper surface 32a of the table 32, the slush mold 3 is guided by the tapered surfaces of the guides 39a so that the slush mold 3 is always placed at the same position on the upper surface 32a.

Further, clamps 38 for fixing the slush mold 3 are provided on the upper surface 32a side of the table 32. The clamps 38 are automatically driven to press a flange portion 3c of the slush mold 3 when a sensor (not shown) has detected that the slush mold 3 is placed on the upper surface 32a of the table 32, thereby fixing the slush mold 3 to the upper surface 32a of the table 32.

In the cooling device 30 thus configured, when a slush mold 3 is placed on the upper surface 32a of the table 32 by the first robot 50, the slush mold 3 is fixed to the upper surface 32a of the table 32 by the automatically driven clamps 38 as shown in FIG. 4A. Then, the rotation mechanism 33 is driven to turn the table 32 upside down above the cooling bath 31 so that the slush mold 3 fixedly placed on the upper surface 32a faces the cooling bath 31 side. However, since the slush mold 3 is fixed by the clamps 38, the slush mold 3 does not fall. Consequently, as shown in FIGS. 4B and 4C, an outer surface 3b, to which a powder resin material 6 is not melted and adhered (not formed with a resin layer 7), of the slush mold 3 is immersed in water in the cooling bath 31 so that the resin layer 7 is cooled with the slush mold 3 so as to be cured. These operations in the cooling device 30 are automatically performed according to a predetermined operation program and input command.

Figure 5A:
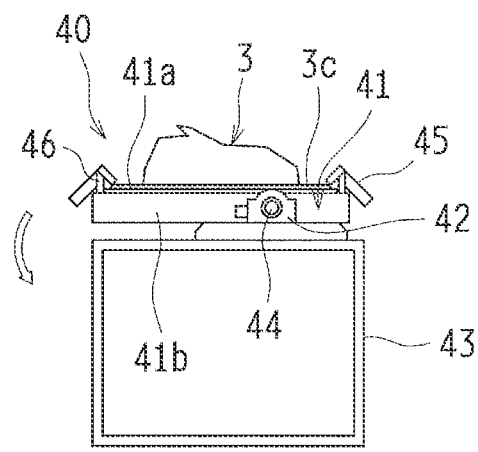
FIG. 5A is a diagram for schematically explaining the operation in a demolding device.
Figure 5B:
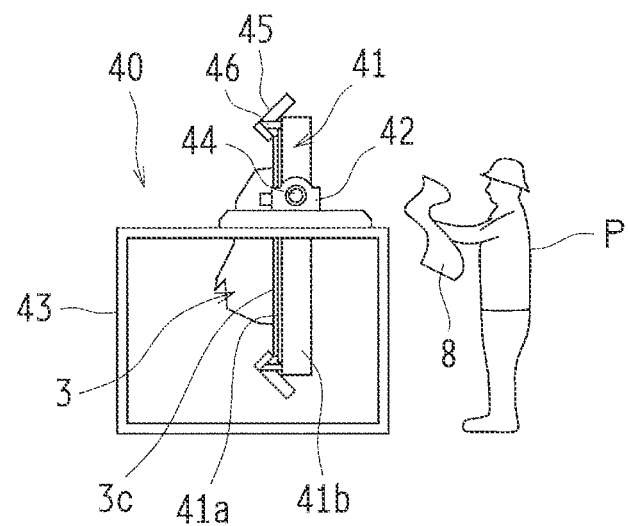
FIG. 5B is a diagram for schematically explaining the operation in the demolding device.

FIGS. 5A and 5B are diagrams for schematically explaining the operations in the demolding device 40. As shown in FIG. 5A, the demolding device 40 includes a frame 41, a pivot mechanism 42 configured to pivot the frame 41, and a stand 43 supporting the pivot mechanism 42. The frame 41 has a rectangular frame shape, and a rotary shaft 44 is attached to the frame 41 to pass through one-end portions (end portions on the right side in FIG. 5A) of a pair of side surfaces 41b facing each other. The pivot mechanism 42 includes a motor, a speed reducer, and so on like the rotation mechanism 33 and is configured to rotate the rotary shaft 44 at an appropriate speed. The pivot mechanism 42 is fixed to an upper end portion of the stand 43. That is, the frame 41 is supported by the stand 43 so as to be pivotable about the rotary shaft 44 via the pivot mechanism 42. The demolding device 40 is, for example, partitioned by a curtain or the like so that a worker P cannot approach close to the demolding device 40 when the pivot mechanism 42 or the like is turned on.

Guides 46 for positioning a slush mold 3 are provided on the upper surface 41a side of the frame 41. As shown in FIG. 5A, the guides 46 are provided at both end portions of the upper surface 41a in a direction (right-left direction in FIG. 5A) perpendicular to the longitudinal direction so as to face each other, and facing surfaces of the guides 46 form tapered surfaces that extend away from each other as going upward. With this configuration, when placing a slush mold 3 on the upper surface 41a of the frame 41, the slush mold 3 is guided by the tapered surfaces of the guides 46 so that the slush mold 3 is always placed at the same position on the upper surface 41a.

Further, clamps 45 for fixing the slush mold 3 are provided on the upper surface 41a side of the frame 41. The clamps 45 are automatically driven to press a flange portion 3c of the slush mold 3 when a sensor (not shown) has detected that the slush mold 3 is placed on the upper surface 41a of the frame 41, thereby fixing the slush mold 3 to the upper surface 41a of the frame 41.

In the demolding device 40 thus configured, when a slush mold 3 is placed on the upper surface 41a of the frame 41, the slush mold 3 is fixed to the upper surface 41a of the frame 41 by the automatically driven clamps 45. Then, the pivot mechanism 42 is driven to pivot the frame 41 counterclockwise by 90 degrees as indicated by a white arrow in FIG. 5A so that, as shown in FIG. 5B, an inner surface 3a of the slush mold 3 fixedly placed on the upper surface 41a of the frame 41 faces one side (right side in FIG. 5B). In this state, the pivot mechanism 42 is turned off so that the worker P is allowed to approach close to the demolding device 40.

Then, as shown in FIG. 5B, the worker P removes a slush skin 8 from the slush mold 3 with its inner surface 3a facing the one side, and the demolding operation ends. In this way, with the demolding device 40 of this embodiment, the worker P can perform the demolding operation in a natural posture, and, even at the occurrence of a power failure or the like, since there is no possibility that the frame 41 or the slush mold 3 hits the worker P, the worker P can perform the operation safely. Provided that the demolding operation has ended and that the worker P is away from the demolding device 40, the pivot mechanism 42 is turned on so that the frame 41 pivots clockwise by 90 degrees to return to the state of FIG. 5A.

Temporary-Placement Space

FIGS. 14A and 14B are typical time charts in powder slush molding. As shown in FIG. 14B, the process in the order of heating, rocking, cooling, and demolding may be repeated using a single slush mold. However, as is clear by comparison with FIG. 14A, in order to improve productivity, it is preferable to perform simultaneous production using a plurality of slush molds, more specifically, using slush molds as many as the number of working devices.

In a powder slush molding method, the process of heating a slush mold in a heating device usually takes the longest time, and therefore, as shown in FIG. 14A, it is efficient to circulate slush molds such that the heating operations for the slush molds are continuously performed in the heating device.

However, when performing the simultaneous production using the slush molds as many as the number of the working devices, one or more excess facilities are required.

Figure 15A:
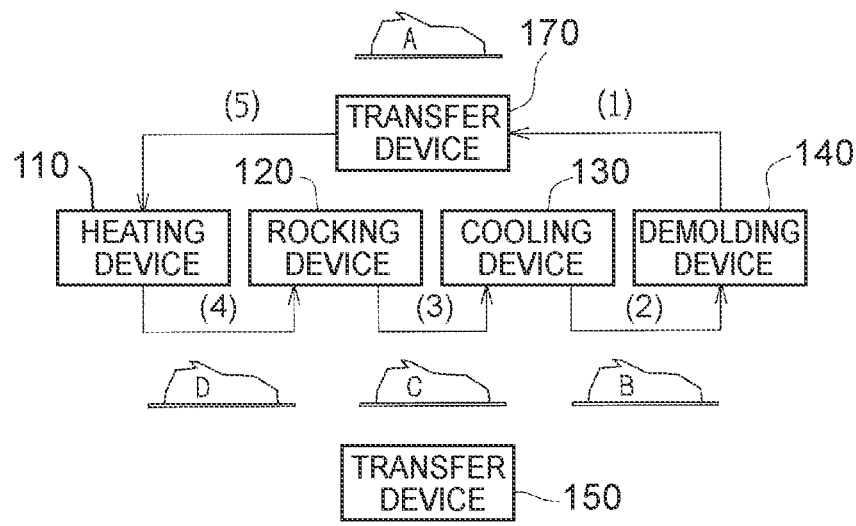
FIG. 15A is a diagram for schematically explaining the circulation sequence of molds when a transfer device is added as an excess facility.

For example, as shown in FIG. 15A, by adding a transfer device 170 as an excess facility and by transferring, (1) while a slush mold A having been subjected to demolding is held suspended by the transfer device 170, (2) a slush mold B from a cooling device 130 to a demolding device 140, (3) a slush mold C from a rocking device 120 to the cooling device 130, and (4) a slush mold D from a heating device 110 to the rocking device 120 in this order using a transfer device 150, (5) the slush mold A having been subjected to demolding can be transferred to the heating device 110.

Figure 15B:
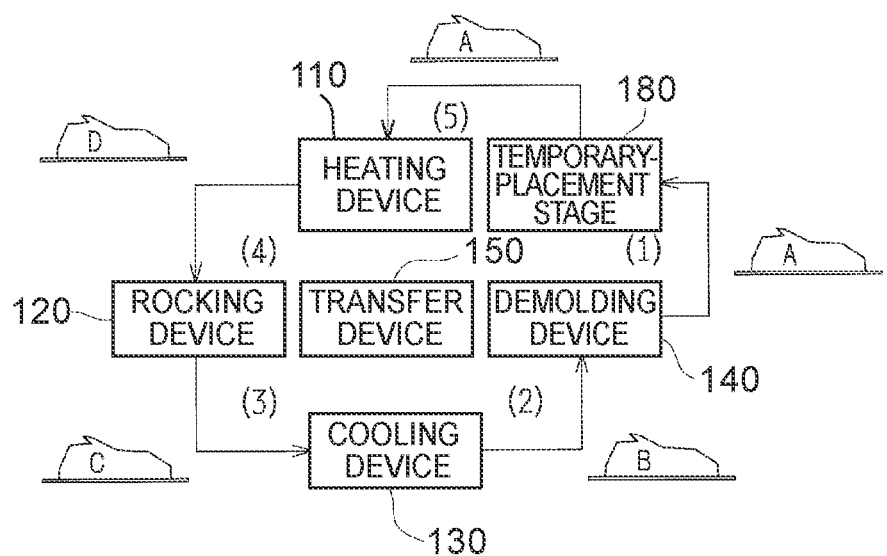
FIG. 15B is a diagram for schematically explaining the circulation sequence of molds when a temporary-placement stage is added as an excess facility.

For example, as shown in FIG. 15B, by adding a temporary-placement stage 180 as an excess facility and by transferring, (1) while a slush mold A having been subjected to demolding is placed on the temporary-placement stage 180, (2) a slush mold B from a cooling device 130 to a demolding device 140, (3) a slush mold C from a rocking device 120 to the cooling device 130, and (4) a slush mold D from a heating device 110 to the rocking device 120 in this order using a transfer device 150, (5) the slush mold A having been subjected to demolding can be transferred to the heating device 110.

However, with the configuration in which the transfer device 170 or the temporary-placement stage 180 is added as described above, there arises a problem that the installation space increases or a problem that the equipment investment becomes large depending on the scale of the transfer device 170 or the temporary-placement stage 180.

Figure 6:
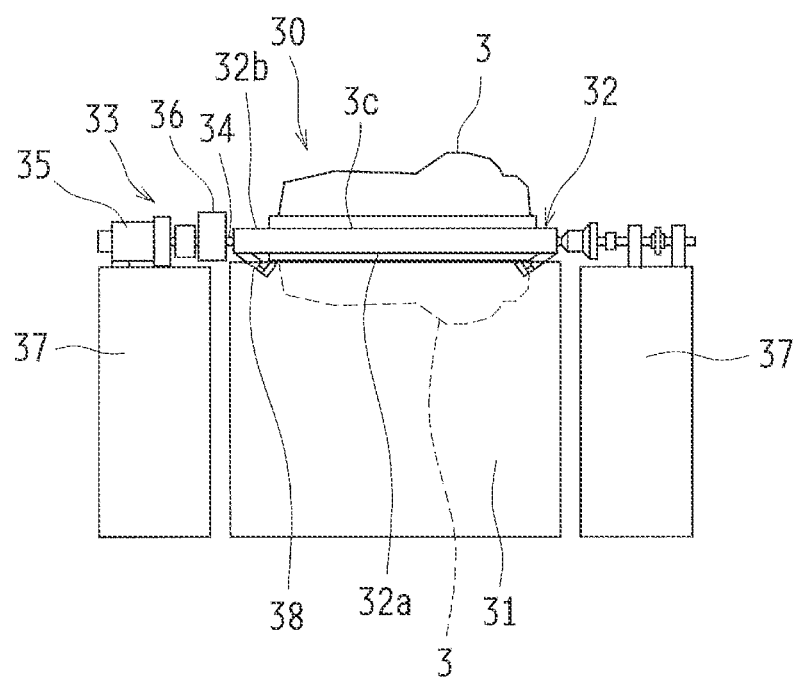
FIG. 6 is a diagram schematically showing a table.

In view of this, in the powder slush molding system 1 of this embodiment, a temporary-placement (standby) space for a slush mold 3 having been subjected to demolding is secured using the existing working device. Specifically, as shown in FIG. 6, the table 32 of the cooling device 30 is configured such that a slush mold 3 can be placed also on a back surface 32b that faces upward in an upside-down state.

With this configuration, since the temporary-placement space for a slush mold 3 having been subjected to demolding is secured by the table 32 of the cooling device 30, the slush mold 3 can be smoothly transferred to the most time-consuming heating device 10 while suppressing an increase in installation space. Further, since the slush mold 3 can be placed on the back surface 32b of the table 32 that is turned upside down above the cooling bath 31, the existing facility can be used so that it is possible to suppress equipment investment.

In the powder slush molding system 1 of this embodiment, in order to make the most of the temporary-placement space provided by the back surface 32b of the table 32, various measures are taken as follows.

First, as shown in FIG. 4C, guides 39b (second guides) for positioning a slush mold 3 are provided on the back surface 32b side of the table 32 at the same position as the positioning position on the upper surface 32a. Like the guides 39a, the guides 39b are provided at both end portions of the back surface 32b in the direction perpendicular to the longitudinal direction so as to face each other, and facing surfaces of the guides 39b form tapered surfaces that extend away from each other as going upward. With this configuration, when placing a slush mold 3 on the back surface 32b of the table 32, the slush mold 3 is guided by the tapered surfaces of the guides 39b so that the slush mold 3 is always placed at the same position on the back surface 32b.

Since, as described above, the table 32 is configured to be rotatable about the rotary shaft 34 passing through the centers of the pair of side surfaces 32c facing each other, the plane position and height of the upper surface 32a and the plane position and height of the back surface 32b when turned upside down can be made the same. Further, by providing the guides 39b on the back surface 32b side, the plane position and height of a slush mold 3 before and after cooling fixedly placed on the upper surface 32a and the plane position and height of a slush mold 3 after demolding temporarily placed on the back surface 32b turned upside down can be made the same. Therefore, even when transfer of the slush mold 3 is repeated by the automated first robot 50 as in this embodiment, the slush mold 3 can be reliably transferred between the devices, for example, without failing to pick up the slush mold 3 by the first robot 50.

Figure 7A:
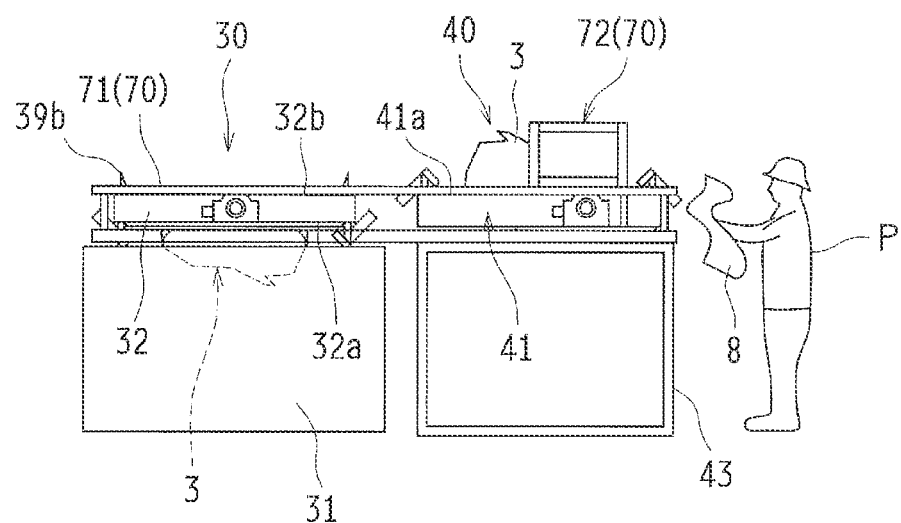
FIG. 7A is a diagram schematically showing the cooling device and the demolding device.
Figure 7B:
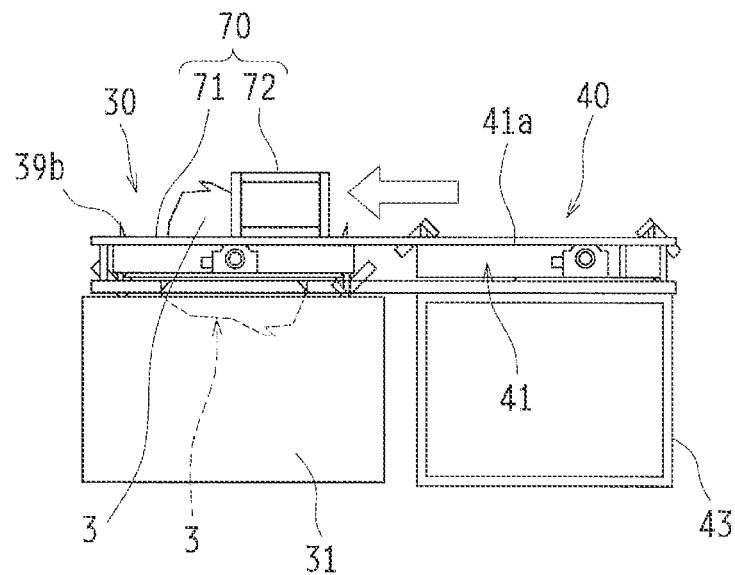
FIG. 7B is a diagram schematically showing the cooling device and the demolding device.

FIGS. 7A and 7B are diagrams schematically showing the cooling device 30 and the demolding device 40. In the powder slush molding system 1 of this embodiment, as shown in FIG. 1 and FIGS. 7A and 7B, a transport mechanism (transport device) 70 is provided. The transport mechanism 70 couples the cooling device 30 and the demolding device 40 together such that the cooling device 30 is located between the first robot 50 and the demolding device 40. The transport mechanism 70 sets the upper surface 41a of the frame 41 of the demolding device 40 to be flush with the upper surface 32a of the table 32 and the back surface 32b of the table 32 turned upside down and moves a slush mold 3 horizontally between the table 32 and the frame 41.

As shown in FIGS. 7A and 7B, the transport mechanism 70 is configured as a simple mechanism including rails 71 laid over the cooling device 30 and the demolding device 40, and transport units 72 that respectively run on the rails 71 by motors (not shown) and include claws (not shown) capable of picking up a slush mold 3. With the transport mechanism 70, as shown in FIG. 7A, when the demolding operation in the demolding device 40 has ended, the transport units 72 picking up a slush mold 3 by the claws run on the rails 71 toward the cooling device 30 so that, as shown in FIG. 7B, the slush mold 3 having been subjected to demolding can be temporarily placed on the back surface 32b of the table 32 with another slush mold 3 being cooled on the upper surface 32a.

In this way, the cooling device 30 and the demolding device 40 are coupled together, and the upper surface 32a (and the back surface 32b when turned upside down) of the table 32 of the cooling device 30 and the upper surface 41a of the frame 41 of the demolding device 40 are flush with each other, and therefore, the slush mold 3 can be freely transported between the cooling device 30 and the demolding device 40 using the simple transport units 72 that run on the rails 71, i.e. while suppressing equipment investment.

Since the cooling device 30 where the slush mold 3 after demolding is temporarily placed is located between the first robot 50 and the demolding device 40, compared to the case where the slush mold 3 after demolding is transferred directly from the demolding device 40, it is possible to downscale the first robot 50, i.e. suppress an increase in installation space and equipment investment.

Operation Sequence

Next, a description will be given of the operation sequence using the powder slush molding system 1 in the case where the sequence is configured such that the operations end in order of demolding, cooling, rocking, and heating.

Figure 8:
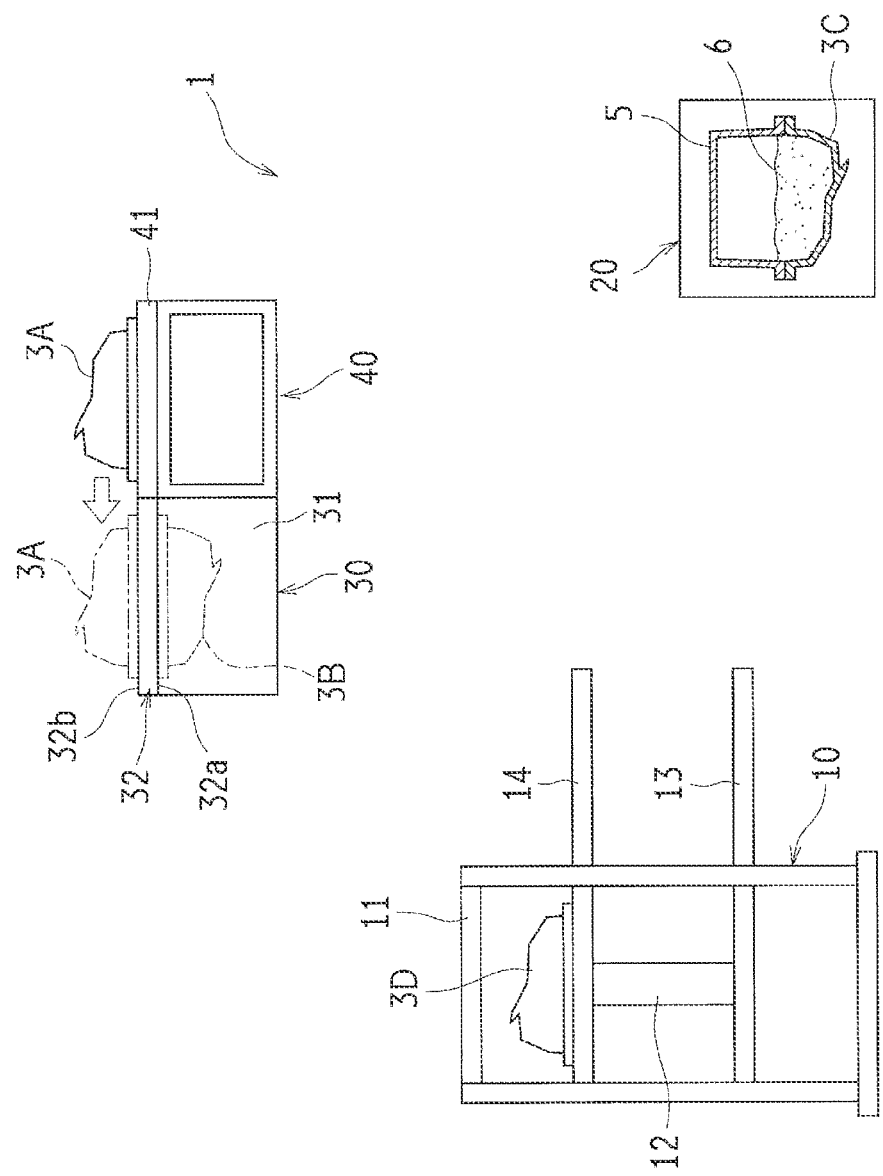
FIG. 8 is a diagram for schematically explaining the circulation sequence of molds in the powder slush molding system.

As shown in FIG. 8, when demolding in the demolding device 40 has ended in the state where a slush mold 3D is present in the heating device 10, a slush mold 3C is present in the rocking device 20, a slush mold 3B is present in the cooling device 30, and a slush mold 3A is present in the demolding device 40, even when the first robot 50 is performing another operation, the slush mold 3A can be transported to the cooling device 30 by the transport mechanism 70 as indicated by a white arrow in FIG. 8. Consequently, the slush mold 3A can be temporarily placed on the back surface 32b of the table 32 during cooling of the slush mold 3B in the cooling bath 31. In this event, by positioning the slush mold 3A using the guides 39b, the plane position and height of the temporarily placed slush mold 3A can be made the same as the plane position and height of the slush mold 3B before and after cooling fixedly placed on the upper surface 32a.

Figure 9:
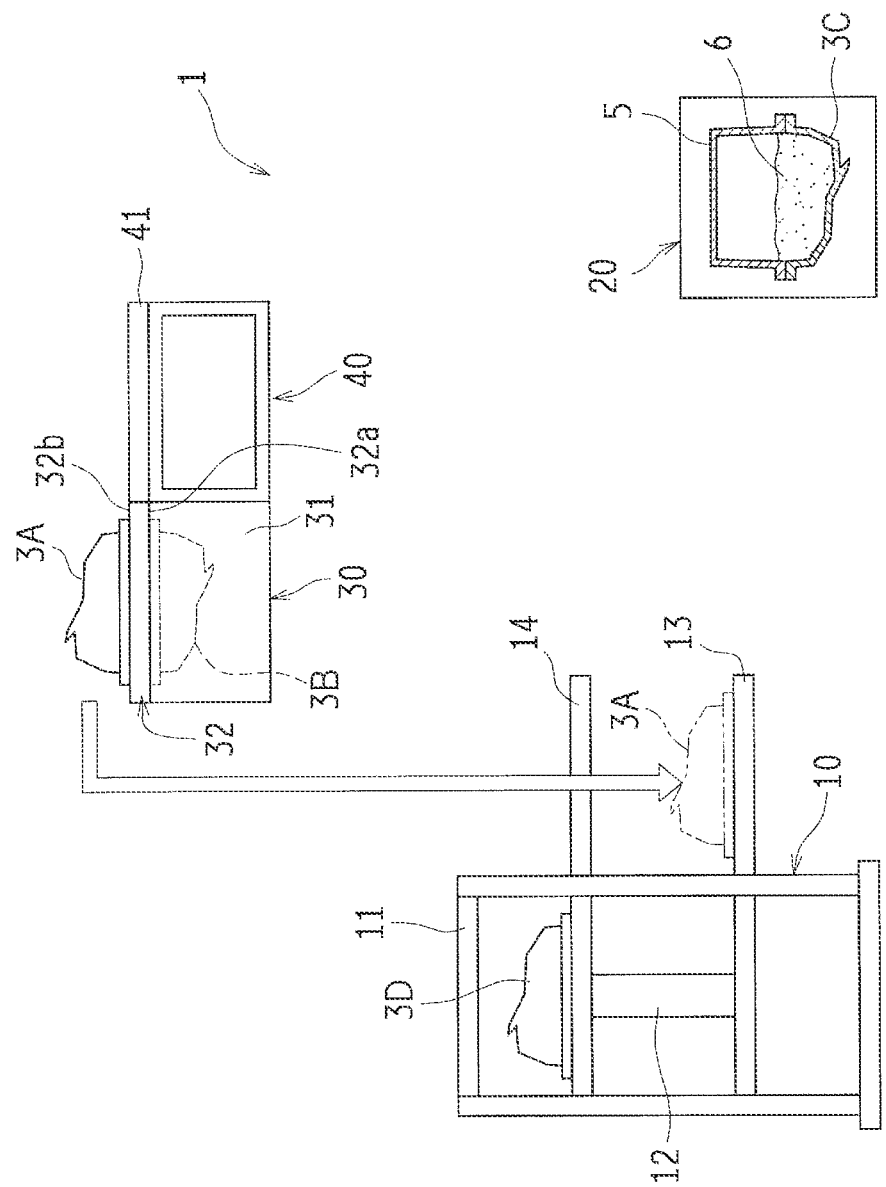
FIG. 9 is a diagram for schematically explaining the circulation sequence of the molds in the powder slush molding system.

Then, as indicated by a white arrow in FIG. 9, the slush mold 3A is transferred from the cooling device 30 to the heating device 10 (more specifically, to the lower placement stage 13) by the first robot 50. Since the cooling device 30 is located between the first robot 50 and the demolding device 40, compared to the case where the slush mold 3A is transferred directly from the demolding device 40, it is possible to downscale the first robot 50.

Figure 10:
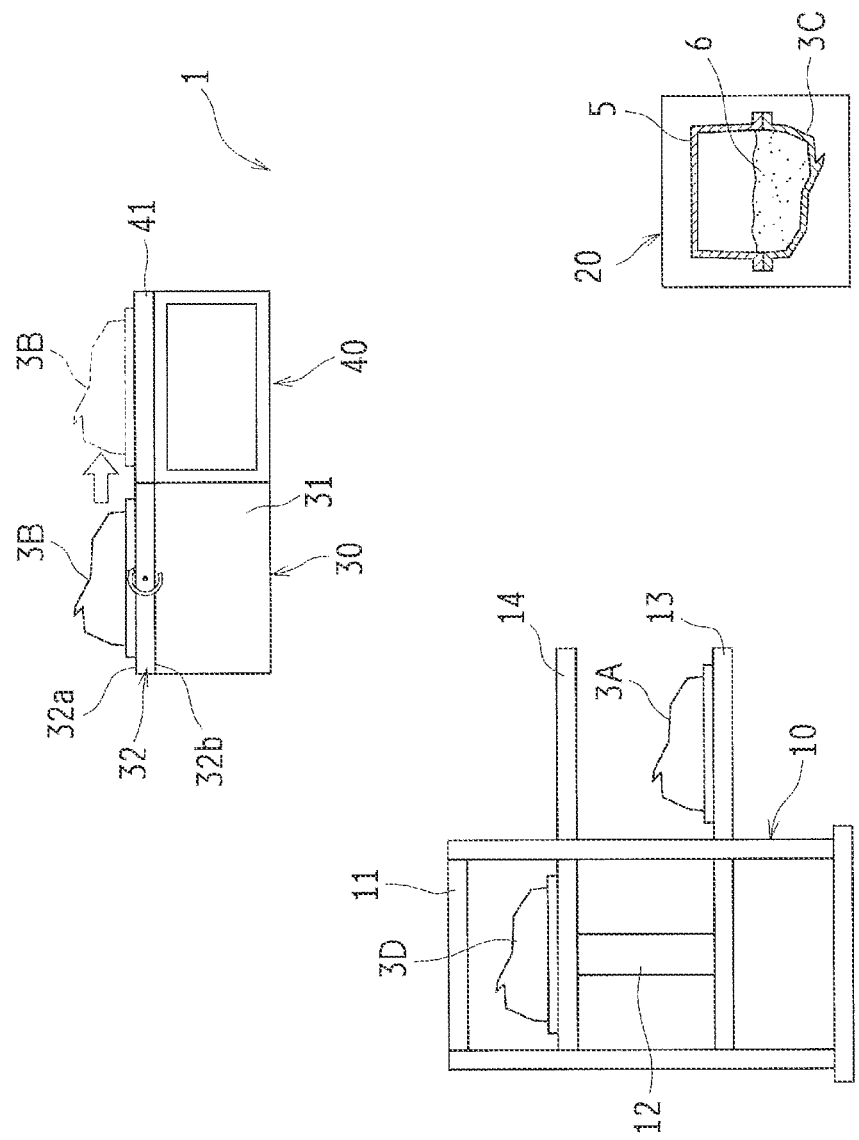
FIG. 10 is a diagram for schematically explaining the circulation sequence of the molds in the powder slush molding system.

When cooling of the slush mold 3B has ended while transferring the slush mold 3A to the heating device 10 by the first robot 50, the table 32 is turned upside down and then the slush mold 3B can be transported to the demolding device 40 by the transport mechanism 70 as shown in FIG. 10 without waiting for the end of the transfer of the slush mold 3A. Consequently, the vacant state of the cooling device 30 is created.

Figure 11:
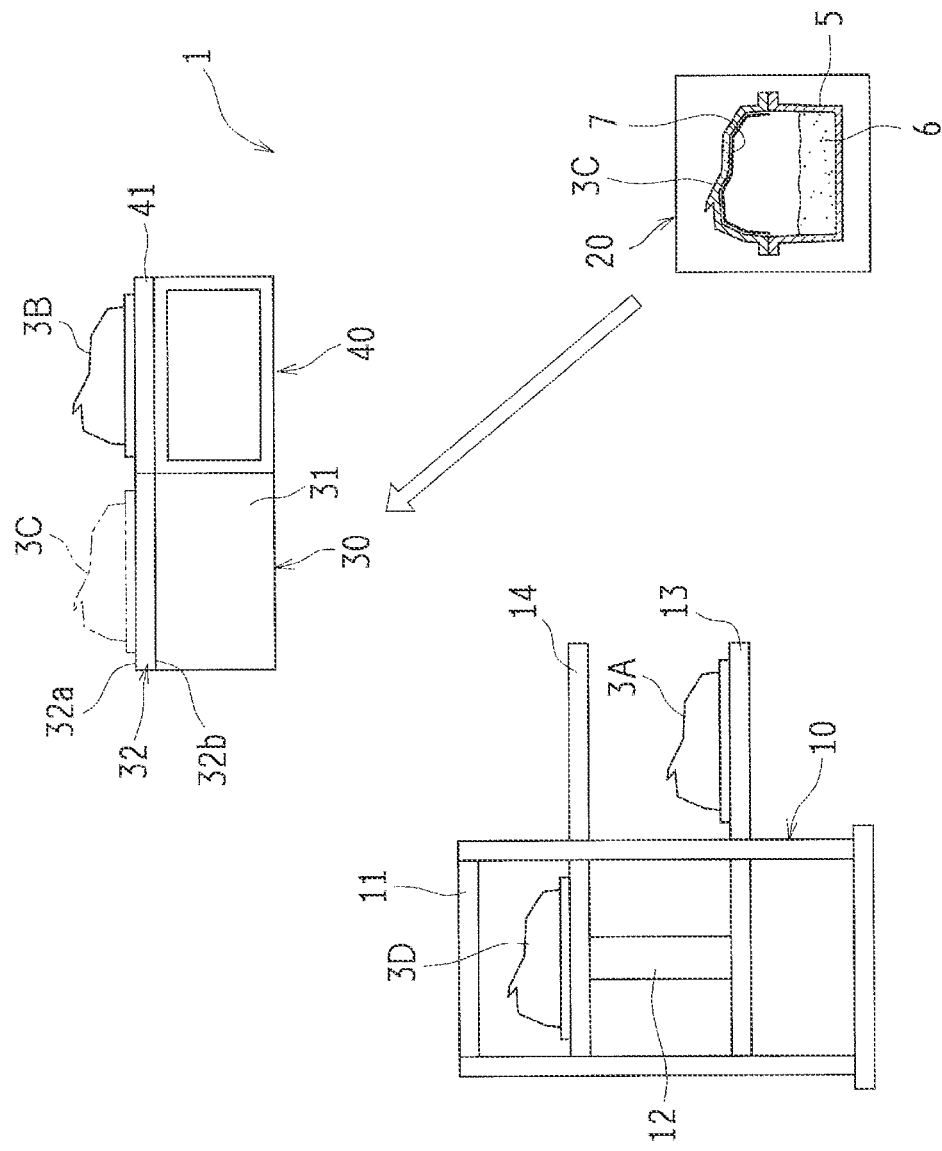
FIG. 11 is a diagram for schematically explaining the circulation sequence of the molds in the powder slush molding system.

Then, when the forming operation of the slush mold 3C has ended, the slush mold 3C can be transferred to the vacant cooling device 30 as shown in FIG. 11 by the first robot 50 that has finished the transfer of the slush mold 3A to the heating device 10. Consequently, the vacant state of the rocking device 20 is created.

Figure 12:
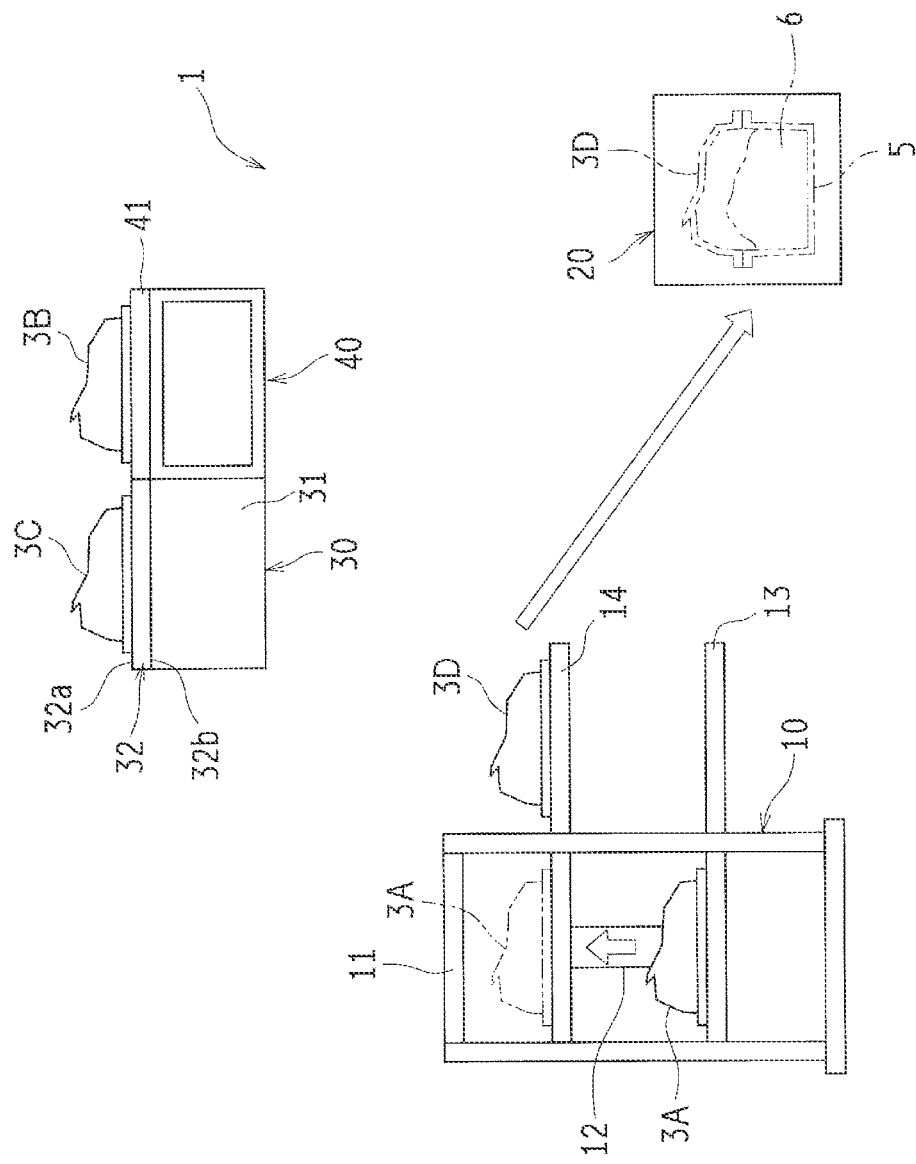
FIG. 12 is a diagram for schematically explaining the circulation sequence of the molds in the powder slush molding system.

Then, when heating of the slush mold 3D has ended so that the slush mold 3D is unloaded from the heating furnace 11 onto the upper placement stage 14, the slush mold 3A is loaded into the heating furnace 11 in turn and the slush mold 3D can be immediately transferred to the vacant rocking device 20 by the first robot 50 as shown in FIG. 12. Consequently, it is possible to continuously perform heating by the heating device 10 that takes the longest time, and suppress the influence on the quality due to temperature drop of the heated slush mold 3D.

Figure 13:
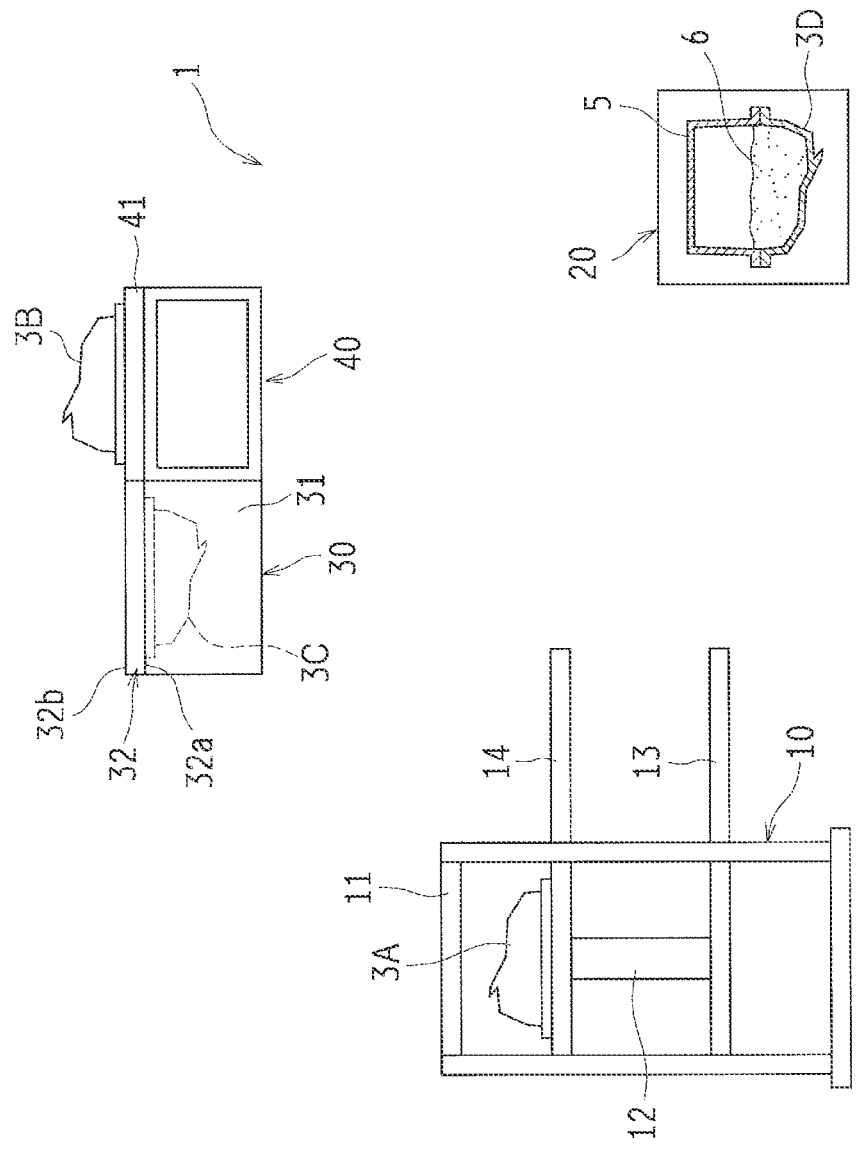
FIG. 13 is a diagram for schematically explaining the circulation sequence of the molds in the powder slush molding system.

As a result, as shown in FIG. 13, the state is achieved in which the slush mold 3A is present in the heating device 10, the slush mold 3D is present in the rocking device 20, the slush mold 3C is present in the cooling device 30, and the slush mold 3B is present in the demolding device 40.

Therefore, by repeating the same sequence, it is possible to perform simultaneous production of slush skins 8 efficiently and with high quality by smoothly circulating the four slush molds 3A, 3B, 3C, and 3D as many as the number of working devices, i.e. the heating device 10, the rocking device 20, the cooling device 30, and the demolding device 40, in the powder slush molding system 1.

In the powder slush molding system 1 of this embodiment, since the lower placement stage 13 of the heating device 10 serves to provide a temporary-placement (standby) space, the temporary-placement space using the back surface 32b of the table 32 seems to be unnecessary. However, in the case where a slush mold 3 having been subjected to demolding is transferred directly from the demolding device 40 to the heating device 10 (the lower placement stage 13), it becomes difficult to downscale the first robot 50, and if, in order to solve it, the cooling device 30 and the demolding device 40 are arranged side by side (arranged in the right-left direction in FIG. 1) to dispose the demolding device 40 closer to the heating device 10, the workspace may be unnecessarily enlarged.

Further, in order to reduce the cycle to have no play in the configuration where the slush mold 3 having been subjected to demolding is transferred directly from the demolding device 40 to the heating device 10 (the lower placement stage 13), the sequence is formed such that the slush mold 3 having been subjected to demolding is transferred to the heating device 10 after waiting for the end of rocking or cooling, and therefore, a case may arise where there is no slush mold 3 on the lower placement stage 13 although heating can be started. That is, although it is possible to simply circulate slush molds 3 as many as the number of working devices by merely providing a temporary-placement (standby) space, it is not always possible to smoothly transfer the slush mold 3 to the most time-consuming heating device 10. Accordingly, also from this point of view, the temporary-placement space using the back surface 32b of the table 32 is significant.

Other Embodiments

The disclosure is not limited to the embodiment described above and can be carried out in various ways without departing from its spirit or its main features.

In the embodiment described above, the slush mold 3 is cooled in the cooling bath 31 storing water, but not limited thereto. For example, the slush mold 3 may be cooled in a cooling bath storing sand or in a cooling bath where cold water showers spout.

In the embodiment described above, the clamps 38 are provided only on the upper surface 32a side of the table 32, but not limited thereto. For example, clamps 38 may be provided also on the back surface 32b side of the table 32.

In this way, the embodiment disclosed above is for illustrative purposes only and should not be construed as being limitative in any aspect. Further, changes and modifications that fall within the range of equivalents of the claims are all within the scope of the disclosure.

According to the disclosure, it is possible to smoothly perform simultaneous production using molds as many as the number of working devices while suppressing an increase in installation space and equipment investment, and therefore, it is highly beneficial to apply the disclosure to a powder slush molding system.

What is claimed is:

1. A powder slush molding system that molds a slush skin by melting and adhering a powder resin material to an inner surface of a mold that is heated, the powder slush molding system comprising:

a heating device configured to heat the mold using a heating furnace;

a rocking device configured to rock the mold, the rocking device configured to rock the mold in a state where the powder resin material is supplied to the mold that is heated;

a cooling device configured to cool the mold to which the powder resin material is melted and adhered;

a demolding device configured to remove the slush skin from the mold that is cooled; and a transfer device configured to transfer the mold between the heating device, the rocking device, the cooling device, and the demolding device, wherein:

the cooling device includes a cooling bath and a table configured to turn upside down vertically above the cooling bath;

the mold fixedly placed on an upper surface of the table faces a cooling bath side when the table is turned upside down; and the table is configured to allow the mold to be placed on a back surface of the table, the back surface facing upward when the table being turned upside down, wherein:

the cooling device is coupled to the demolding device; and the demolding device includes a frame having an upper surface that is flush with the upper surface of the table and with the back surface of the table turned upside down, the frame configured to allow the mold to be placed on the upper surface of the frame, the powder slush molding system further comprising a transport device configured to move the mold between the table and the frame.

2. The powder slush molding system according to claim 1, wherein:

the table has a shape of a rectangular parallelepiped and is configured to be rotatable about an axis passing through centers of a pair of side surfaces, facing each other, of the rectangular parallelepiped;

a first guide for positioning the mold is provided on an upper surface side of the table; and a second guide for positioning the mold is provided on a back surface side of the table at a position that is the same as a positioning position of the mold on the upper surface of the table.

3. The powder slush molding system according to claim 1, wherein the cooling device is located between the transfer device and the demolding device.

\* \* \* \* \*